May 23, 1967  H. HEEREN ETAL  3,320,784
TOOL FOR SECURING THIN-WALLED TUBES IN TUBE PLATES
Filed Jan. 22, 1965

INVENTORS
Hermann Heeren
Wolfgang Pohl
Bernhard Dege
BY Bailey, Stephens and Huettig
ATTORNEYS

United States Patent Office 3,320,784
Patented May 23, 1967

3,320,784
TOOL FOR SECURING THIN-WALLED TUBES IN TUBE PLATES
Hermann Heeren, Wolfgang Pohl, and Bernhard Dege, Nurnberg, Germany, assignors to Maschinenfabrik Augsburg-Nurnberg AG., Nurnberg, Germany
Filed Jan. 22, 1965, Ser. No. 427,265
7 Claims. (Cl. 72—56)

This invention relates to a tool for securing thin-walled cooling tubes such as used in heat exchangers in the tube plates.

In particular, this invention is directed to the production and use of a tool body having a longitudinal passageway leading into a reduced head portion and from there communicating with radially directed slots to a chamber formed when the tool is inserted within a tube. An explosive force is used in conjunction with an incompressible force distributing means for expanding the tube. This invention is usable with smooth-walled tubes, non-circular tubes and tubes having internal longitudinal fins.

Heretofore, smooth-walled tubes have been fastened in tube plates by means of a roller expanding process or by expanding the tube by tapered mandrels. A hydraulic process has also been used in which the tube is expanded by a multiple split ring drawn through the tube. A further process uses a three-piece sleeve hydraulically expanded over a cone within the tube. It has also been suggested to drive a stepped mandrel into the tube and then to withdraw it by hydraulic means after the tube has been expanded. All of these processes needed a number of tools and fixtures and took considerable time.

Another method which has been used for fastening tubes in a tube plate, such as in constructing a heat exchanger, is by inserting into the tube a cylindrical body having a longitudinal passageway which communicates through transverse holes to an annular chamber formed by an outer surface of the tool body and the inner wall of the tube. This method requires that the pressure chamber be sealed by means of conical rings and adjusting nuts to create the forming fixture and is expensive. Furthermore, it requires not only a very complicated assembly, but also considerable time for inserting and removing the tool and adjusting the parts for each tube expansion operation.

Also, it is generally known to use a gel as a plastic non-compressible force distributing medium and forming sheets and plates by exploding the gel. Tubes can be expanded into various shapes by this method. However, the method requires special dies, die holders and steel inserts in special grooves within the die which makes the method unwieldly and too complicated and time consuming for its use in the fastening of tubes in the tube plates of heat exchangers which often have more than a thousand tubes.

The object of this invention is to produce a tool and method of using the same which avoids the disadvantages of the prior art structures. According to this invention, the tool body has a head adapted to be inserted in the tube that is to be expanded, said head having two piston-shaped lands between which is a reduced tool portion. These two lands closely fit the interior of the tube, and the reduced tool portion together with the inner wall of the tube forms a chamber for receiving a non-compressible force distributing medium in the tube portion that is to be expanded. This force distributing medium is fed into the tool body portion through a non-return check valve. An explosive force is produced upon the force distributing medium and into the pressure chamber by means of an explosive charge placed in the tool body and fired by a firing mechanism of conventional design. In a further embodiment of this invention, the tool body is provided with a flange for bearing against the end of the tube or upon the tube plate. This flange has radially extending grooves which permit the fluid force distributing medium in the pressure chamber to leak out when the pressure chamber is full. Also, the force distributing medium is supplied by a pipe connection surrounding the tool body at about the middle thereof. This point communicates with a bore leading from the supply pipe into the passageway within the tool, with the bore lying at an acute angle with respect to the direction of the explosive force which is applied to the passageway. A non-return check valve is included in the pipe connection.

In the general operation of this invention, the end of each tube is inserted through its corresponding hole in the tube plate. The tool body is then briefly introduced into the end of the tube, the tube expanded, and then the tool inserted into a following tube. During the time the tool body is inserted into the body of the tube, an explosive force is produced to expand the tube, which means that one tube after another can be expanded and fastened to the tube plate very quickly and in rapid sequence, without needing any ancillary means.

The means by which the objects of this invention are obtained are disclosed more fully with reference to the accompanying drawings in which.

Figure 4:
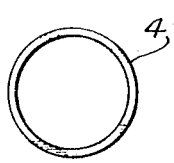
Figure 5:
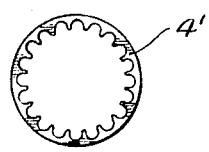

FIGURES 4 and 5, respectively, are end views of the types of tube shapes that can be expanded according to this invention.

Figure 1:
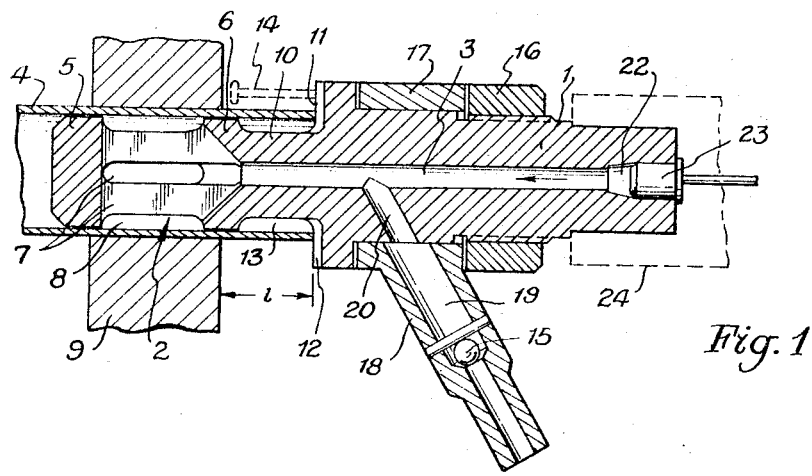
FIGURE 1 is a cross-sectional view through the tool body of this invention and as inserted within a tube to be expanded and fastened to a tube plate.

As shown in FIGURE 1, the tool body 1 has a reduced body head portion 2 in which terminates an axial passageway 3 in the body 1. This head portion is adapted to be inserted into the end portion of a tube 4 for expanding such end portion. The reduced body head portion 2 extends between a pair of spaced lands 5 and 6, which lands are slidable within the tube 4. Reduced head portion 2 has a plurality of slots 7 which provide communication between passageway 3 and a chamber 8 formed between the reduced body head portion 2 and the inner wall of tube 4. As shown, the tube 4 extends through a hole in the tube plate 9.

Figure 3:
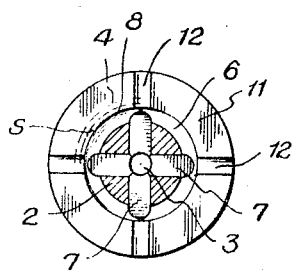
FIGURE 3 is a cross-sectional view taken on the line 3—3 of FIGURE 2.

If the end of each tube 4 is to be provided with a basket for receiving a cleaning brush, such as described in the copending application of Heeren et al., Ser. No. 198,976, filed May 31, 1962, for "Method and Apparatus for Cleaning Surface Condenser and Heat Exchanger Tubes," then the tube projects outwardly from tube plate 9 by a distance $l$ for permitting adjustment of the basket. Consequently, tool body 1 has an added length 10 extending between the land 6 and an annular flange 11 so that, when the flange 11 abuts against the end of the tube 4, the chamber 8 is positioned within tube plate 9 at the exact point where the tube is to be expanded and thus fastened to the tube plate. Annular flange 11 has radially extending crossed grooves 12 in its face abutting the end of tube 4. Consequently, because of the slight clearance between land 6 and the inner wall of tube 4, a pressure medium in chamber 8 can leak through the chamber 13 and outwardly through grooves 12. The clearance $s$ between the land 6 and the inner wall of tube 4 is indicated in FIGURE 3. It is also noted that both lands 5 and 6 must have some clearance with the inner wall of tube 4 in order that the tool body can be easily inserted into the tube.

As indicated, the explosive charge can be triggered by the use of a pin 14 which is actuated upon contact with either the tube plate 9 or with the end of the tube 4.

A check valve 15 is contained within a pipe. This pipe is connected to the tool body 1 by means of a nut 16 which bears against a band 17 surrounding the tool body. This pipe joint includes an element 18 which aligns the pipe passageway 19 with a bore 20 extending through the tool body 1 into the passageway 3. The bore 20 is at an acute angle with respect to the direction of the explosive force produced in passageway 3.

The outer end of the tool body 1 contains a short explosion chamber 22 aligned with passageway 3 and which is adapted to receive an explosive cartridge 23 which is detonated by a firing pin contained in the gun unit 24 of conventional design. This gun unit 24 can be connected to the tool body 1 by any convenient fastening means such as by a press fit or screw thread so that it can be quickly removed to replace the carttridge 23 so that a large number of tubes can be fastened to the tube plate 9 in the shortest possible time. This detachable connection between the gun unit and tool body also means that the gun unit can be used for tool bodies of different size when such is needed for different sizes and shapes of tools.

In operation, an incompressible force distributing medium such as water is introduced through the check valve 15 and into passageway 3 after the tool body 1 has been inserted into the end of tube 4 and positioned so that the chamber 8 is at the point where the explosive force is to be applied. The fluid passes from the passageway 3 through the slots 7 into the chamber 8 and then some fluid leaks through the space $s$ and outwardly of the grooves 12, thus showing that the chamber 8 is full of fluid. Cartridge 23 is then fired, producing an explosive force against the fluid medium and causing the wall of the tube 4 to be expanded and tightly fastened to the tube plate 9. The tool body can then be removed immediately and inserted into the end of another tube with little loss of time.

Figure 2:
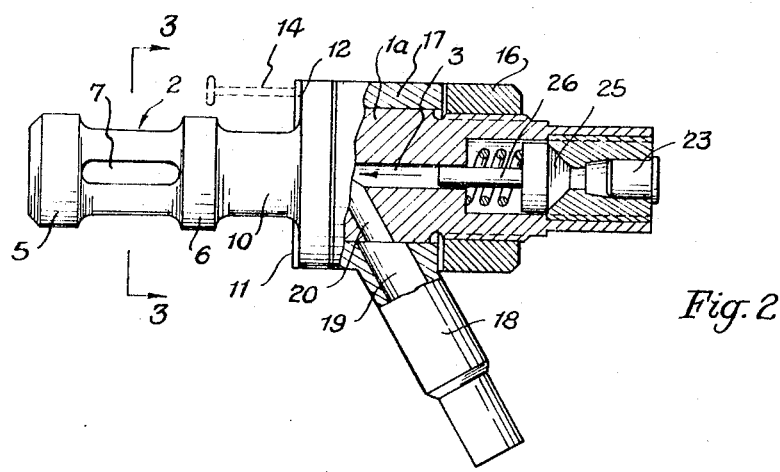
FIGURE 2 is a view similar to FIGURE 1 of a modification of the invention.

In the modification of FIGURE 2, the outer end of the tube body 1a contains an explosion chamber 25 which transmits the explosive force from cartridge 23 onto a spring-loaded differential piston 26. This has the advantage of providing a more favorable force transmission to the fluid medium in passageway 3 by reason of the ratio between the different areas of the differential piston. Another advantage is in that the combustion residue of the exploded cartridge 23 is kept out of the passageway 3 and chamber 8.

FIGURES 4 and 5 are end views of the different kinds of tube shapes to which the tool body 1 can be inserted. FIGURE 4 shows a tube having a smooth interior wall, while FIGURE 5 shows a tube having longitudinally extending internal fins 4'. When a tube having fins 4' is to be expanded, then the lands 5 and 6 are accordingly shaped and also given the same clearance $s$ of FIGURE 3 between the lands and the fins.

Having now described the means by which the objects of the invention are obtained, we claim:

1. A tool for securing a tube end to a tube plate by expanding the tube end in a hole in the tube plate comprising a tool body insertable within the tube, a longitudinally extending passageway in said body, a pair of spaced lands smaller than the interior of the tube at one end of said body, a reduced body portion between said lands for forming a pressure chamber between the reduced body portion and the inner wall of the tube, holes through said reduced body portion for establishing communication between said passageway and said chamber, pipe means including a check valve means attached to said body for supplying a fluid pressure medium into said passageway and said chamber, and explosive replaceable cartridge means joined to said body for applying an explosive pressure force to said fluid medium to expand that part of the tube exposed to said chamber.

2. A tool as in claim 1, further comprising a peripheral flange on said body adapted to bear against the end of the tube, and groove means extending radially of said flange for the leakage of said fluid medium from said chamber.

3. A tool as in claim 2, said check valve means comprising a circular band surrounding said body, a pipe joined to said band, a check valve in said pipe, and bore means in said body for forming an opening between said pipe and said passageway directed at an acute angle with respect to the direction of the force applied by said cartridge means.

4. A tool as in claim 3, further comprising a spring-loaded differential piston in said passageway between said cartridge means and said bore means.

5. A tool as in claim 3, further comprising a peripheral surface on each of said lands having a shape corresponding to the shape of the inner wall of the tube.

6. A tool as in claim 5, further comprising automatic means for feeding cartridges to said cartridge means.

7. A tool as in claim 6, further comprising trigger means for actuating said cartridge means upon the contact of said peripheral flange with the end of the tube.

References Cited by the Examiner

UNITED STATES PATENTS

| | | | |
|---|---|---|---|
| 2,479,702 | 8/1949 | Rodd | 29—421 |
| 2,995,053 | 8/1961 | Freedom | 72—56 |
| 3,127,923 | 4/1964 | Cadwell | 72—56 |

CHARLES W. LANHAM, *Primary Examiner.*

RICHARD J. HERBST, *Examiner.*